United States Patent [19]

Begin

[11] Patent Number: 5,714,881
[45] Date of Patent: Feb. 3, 1998

[54] POSITION MEASUREMENT APPARATUS USING WIRE WAVEGUIDE IN SHOCK RESISTANT SUSPENSION

[75] Inventor: John D. Begin, Troy, Mich.

[73] Assignee: Patriot Sensors and Controls Corporation, Clawson, Mich.

[21] Appl. No.: 615,489

[22] Filed: Mar. 12, 1996

[51] Int. Cl.$^6$ .................................................. G01R 33/18
[52] U.S. Cl. .................................................. 324/207.13
[58] Field of Search ...................... 324/207.13, 207.22, 324/207.23, 207.24, 207.26; 73/313, 314; 333/148

[56] References Cited

U.S. PATENT DOCUMENTS

| | | | |
|---|---|---|---|
| 3,703,681 | 11/1972 | Johnson et al. | 324/207.13 |
| 3,898,555 | 8/1975 | Tellerman | 324/207.13 |
| 4,678,993 | 7/1987 | Vinnemann et al. | 324/207.13 |
| 4,939,457 | 7/1990 | Tellerman | 324/207.13 |
| 4,958,332 | 9/1990 | Tellerman | 324/207.13 |
| 5,076,100 | 12/1991 | Hunter et al. | 324/207.21 X |
| 5,173,658 | 12/1992 | Astrachan et al. | 324/207.12 |
| 5,313,160 | 5/1994 | Gloden et al. | 324/207.13 |
| 5,473,245 | 12/1995 | Silvos, Jr. et al. | 324/207.13 |

Primary Examiner—Sandra L. O'Shea
Assistant Examiner—Roger C. Phillips
Attorney, Agent, or Firm—Young & Basile, P.C.

[57] ABSTRACT

A magnetostrictive wire waveguide type position measuring system wherein the wire waveguide is mounted within a small diameter brass tube which, in turn, is mounted by way of resilient suspension components within a rigid outer tube affixed to a position reference frame. The suspension components isolate the waveguide from relatively high frequency shock inputs characteristic of rough environment applications. The position signal is derived from output signal quantities generated by the propagation times of sonic disturbances from a first reference magnet held in a fixed position relative to the outer housing and a second user magnet which moves relative to the outer housing with the element or quantity being monitored. To compensate for longitudinal movement of the waveguide within the floating suspension system, a computer calculates a variable time delay related to the difference between a constant time quantity and the propagation time of the reference magnet impulse and adds this time delay to the user magnet propagation time. The waveguide terminal ends are gradually reconfigured from round to flat, rectangular sections and sandwiched between acoustic dampening pads to reduce or eliminate sonic reflections. A flexible film piezoelectric pickup is disclosed.

16 Claims, 3 Drawing Sheets ic wire waveguide to measure the position of a moveable element such as a machine tool component or a float is described in the prior art including, by way of example, U.S. Pat. No. 4,839,590 issued Jun. 13, 1989 to Richard Koski, William Kosco, and Arthur Dumais and assigned by mesne assignments to Patriot Sensors, Inc. of Clawson, Mich. In general, the magnetostrictive wire waveguide extends through the measurement field and cooperates with a toroidal "user" magnet which is moveable along and in surrounding relationship to the waveguide, the position of the user magnet being related to the position of a quantity or component being monitored. Although the specific manner of using a magnetostrictive waveguide as a position transducer may vary, the measurement function in all cases involves a determination of the time required for a sonic disturbance to propagate along the waveguide from a fixed position at or near one end of the waveguide to the user magnet or vice versa. Since the propagation speed is known, distance can be determined as a function of time.

POSITION MEASUREMENT APPARATUS USING WIRE WAVEGUIDE IN SHOCK RESISTANT SUSPENSION

RELATED APPLICATION

This application is related to copending applications "Magnetostrictive Position Measurement Apparatus with Anti-Reflection Waveguide Terminals," Attorney's Docket No. PTR-051 and "Magnetostrictive Position Measurement Apparatus and Method of Using Same," Attorney's Docket No. PTR-052, both filed simultaneously herewith by John D. Begin and assigned to Patriot Sensors and Controls, Inc.

FIELD OF THE INVENTION

This invention relates to position measurement apparatus of the type utilizing a magnetostrictive wire waveguide which extends through a measurement field and in which the position of a movable element within the field is determined as a function of the propagation times of sonic disturbances along the waveguide. The inventive apparatus features a resilient suspension system for the waveguide which reduces the effects of external shock and vibration inputs on the accuracy of the measurement function.

BACKGROUND OF THE INVENTION

The use of a magnetostrictive wire waveguide to measure the position of a moveable element such as a machine tool component or a float is described in the prior art including, by way of example, U.S. Pat. No. 4,839,590 issued Jun. 13, 1989 to Richard Koski, William Kosco, and Arthur Dumais and assigned by mesne assignments to Patriot Sensors, Inc. of Clawson, Mich. In general, the magnetostrictive wire waveguide extends through the measurement field and cooperates with a toroidal "user" magnet which is moveable along and in surrounding relationship to the waveguide, the position of the user magnet being related to the position of a quantity or component being monitored. Although the specific manner of using a magnetostrictive waveguide as a position transducer may vary, the measurement function in all cases involves a determination of the time required for a sonic disturbance to propagate along the waveguide from a fixed position at or near one end of the waveguide to the user magnet or vice versa. Since the propagation speed is known, distance can be determined as a function of time.

In such devices, the accuracy of the position measurement can be seriously degraded by high frequency shocks which are transmitted to the waveguide from the outside world through the waveguide housing and support components. Such shocks and reflections thereof can be erroneously interpreted by the pickup as sonic disturbances.

SUMMARY OF THE INVENTION

In accordance with the invention described herein, the effects of environmental shock and vibration on the accuracy of position measurement using a magnetostrictive wire waveguide are substantially reduced. In general, this is achieved by way of (a) a resilient, shock-dampening suspension system which effectively permits the wire waveguide to float relative to mechanical ground; i.e., (a) the position measurement reference, and (b) a signal generating apparatus consisting of a reference magnet disposed in operative association with the wire waveguide but fixed mechanically relative to the reference, and at least one user magnet which is moveable along and over the waveguide in proportion to the movement and/or position of the element or quantity being monitored. Both magnets create sonic disturbances which propagate toward a pickup located near one end of the waveguide and the signals resulting from both such disturbances are used in determining the absolute position of the user magnet or magnets. Because both reference and user magnets are tied to the same reference frame, shifts in the waveguide permitted by the resilient suspension are of no effect on measurement accuracy.

These and other features and advantages of the present system will be apparent from a reading of the following specification which describes an illustrative embodiment in detail.

DETAILED DESCRIPTION OF THE ILLUSTRATIVE EMBODIMENT

Figure 1:
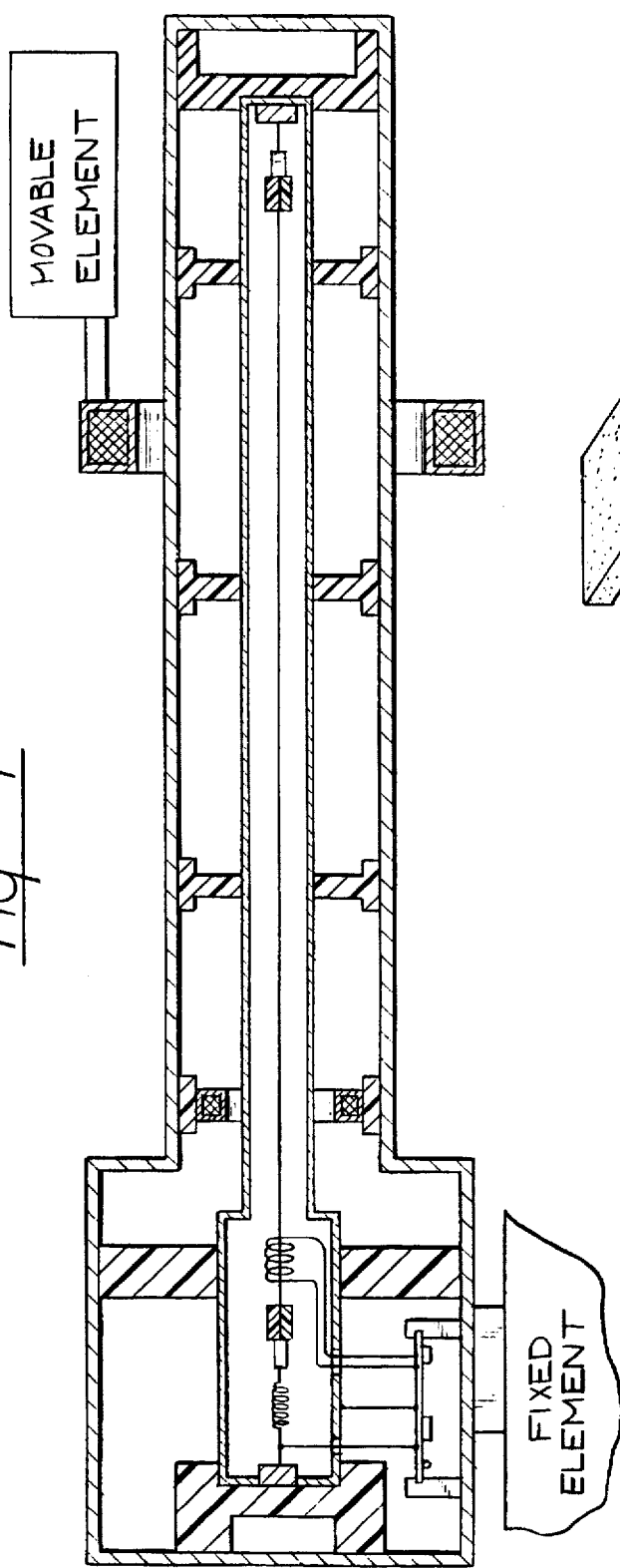
FIG. 1 is a cross-sectional view of a wire waveguide position measurement apparatus illustrating a shock resistant suspension system for the waveguide.

Referring to FIG. 1, there is shown a magnetostrictive wire waveguide type position measurement apparatus 10 for determining the position of a moveable element 12 relative to a fixed or reference element 14. It will be appreciated that the moveable and fixed elements 12 and 14 are representative of wide variety of elements, components or quantities associated with various specific applications; by way of example, the moveable element 12 may be a metal cutter mounted and powered to move linearly relative to the frame of a machining center, such frame being represented by fixed element 14. The movable element may also represent a blade or shovel of an earth moving machine which is controllable as to position relative to the frame of the vehicle, said frame being represented by the fixed element 14. Still other possibilities will be apparent to persons skilled in the various arts.

Measurement apparatus 10 comprises a magnetostrictive wire waveguide 16 in the form of a substantially uniform, 0.025" diameter nickel iron alloy wire extending linearly and under tension through a measurement field ranging from a few inches to hundreds of feet. Wire waveguide 16 is mounted concentrically within a 0.125" outer diameter brass tube 18 by way of shackles 20 and 22. Shackle 20 is used as a coupling between the wire waveguide 16 and a compression spring 24 which in turn is secured to an anchor 26, the spring serving to apply appropriate tension to the waveguide essentially to maintain its physical straightness through the interior of the brass tube 18; i.e., the tension applied to the tube is essentially unrelated to the propagation speed of sonic impulses therethrough as hereinafter discussed. Shackle 22 also serves as a coupling between the wire waveguide 16 and a connecting element which is secured to the brass tube by anchor 28. The wire waveguide 16, the shackles 20 and 22, the spring 24 and the brass tube 18 are all conductive so that an electrical circuit is established between terminals on the ends of signal input wires 34 which are connected to electronics or circuit board 35 hereinafter described with reference to FIG. 3. Reflection damping pads 30 and 32 of silicon rubber or other appropriate resilient material are clamped about the terminal ends of the wire waveguide 16 for reflection damping purposes as is better described below with reference to FIG. 2. A pick-up coil 36 surrounds the uniform portion of wire waveguide 16 near the left terminal end as shown in FIG. 1 and is connected by conductive wires 38 for connection to circuit board 35.

The arrangement and dimensions given above are examples only. The waveguide, for example, need not be linear but may be curved to accommodate a given measurement field.

The brass tube 18 containing the waveguide 16 is resiliently mounted within a steel outer housing 40 having a head 50 and a body 51 of generally tubular configuration by means of washer or disk shaped suspension components 42, 44, 46, and 48 of silicon rubber or other resilient material. Rubber acoustic dampening end structures 52 and 54 are provided between the ends of the brass tube 18 and the ends walls of the steel housing 40 to provide resilient suspension in the axial or longitudinal direction. The material and physical properties; i.e., the shape, density and resilience of the acoustic dampening suspension system components 42, 44, 46, 48, 52, and 54 can be chosen to filter out or dampen shock inputs in almost any selected frequency range which is expected in the environment of use. As a general proposition, the material of the suspension system components is chosen to filter out relatively high frequency shock inputs; e.g., those having a characteristic frequency above 200 hertz.

The configurations of the suspension system components in FIG. 1 are intended as examples for illustration only and it will be appreciated by those skilled in the applicable arts that other configurations can be chosen in accordance with the configuration of the anchoring and housing structures associated with a particular waveguide apparatus. In general, it is the objective of the suspension system to isolate the wire waveguide 16 from externally created or applied shock inputs along all three axes; i.e., the longitudinal axis and the radial axis. The effect of "floating" the wire waveguide 16 and its support tube 18 within the fixed external housing 40, however, requires special considerations insofar as position measurement accuracy is concerned as hereinafter described.

As mentioned above, the waveguide 16 serves as a transducer which extends under tension through the measurement field. For this purpose, a first toroidal magnet 56 is mounted within and to the internal cylindrical surface of the steel housing 10 at a point spaced longitudinally from but near the left end of the wire waveguide 16 as shown in FIG. 1; i.e., near the end at which the pick-up coil 36 is located. Magnet 56 is preferably an electromagnet which is excited only when a measurement is underway. However, it may also be a permanent magnet and need not be within the housing 40. In all cases, however, magnet 56 is a position "reference" magnet and is fixed relative to the measurement field.

A second toroidal permanent magnet 58, herein referred to as a "user magnet," is disposed around the cylindrical body 51 of the steel housing 40 in spaced relationship thereto and is moveable longitudinally or axially along the tube 40 and the wire waveguide 16 by virtue of being mechanically attached to the moveable element 12 the position of which is to be monitored. This mechanical connection can take a variety of forms as described briefly above. The advantages of the shock filtering suspension system are, of course, greatest in environments which involve a likelihood of shock or vibration.

Figure 6:
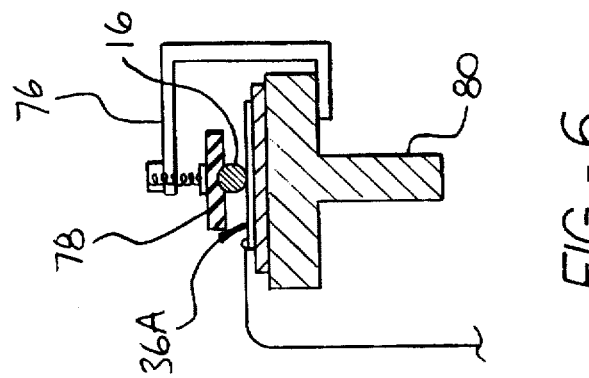
FIGS. 5 and 6 are cross-sectional views of the apparatus of FIG. 1 with an alternative signal pickup.
Figure 5:
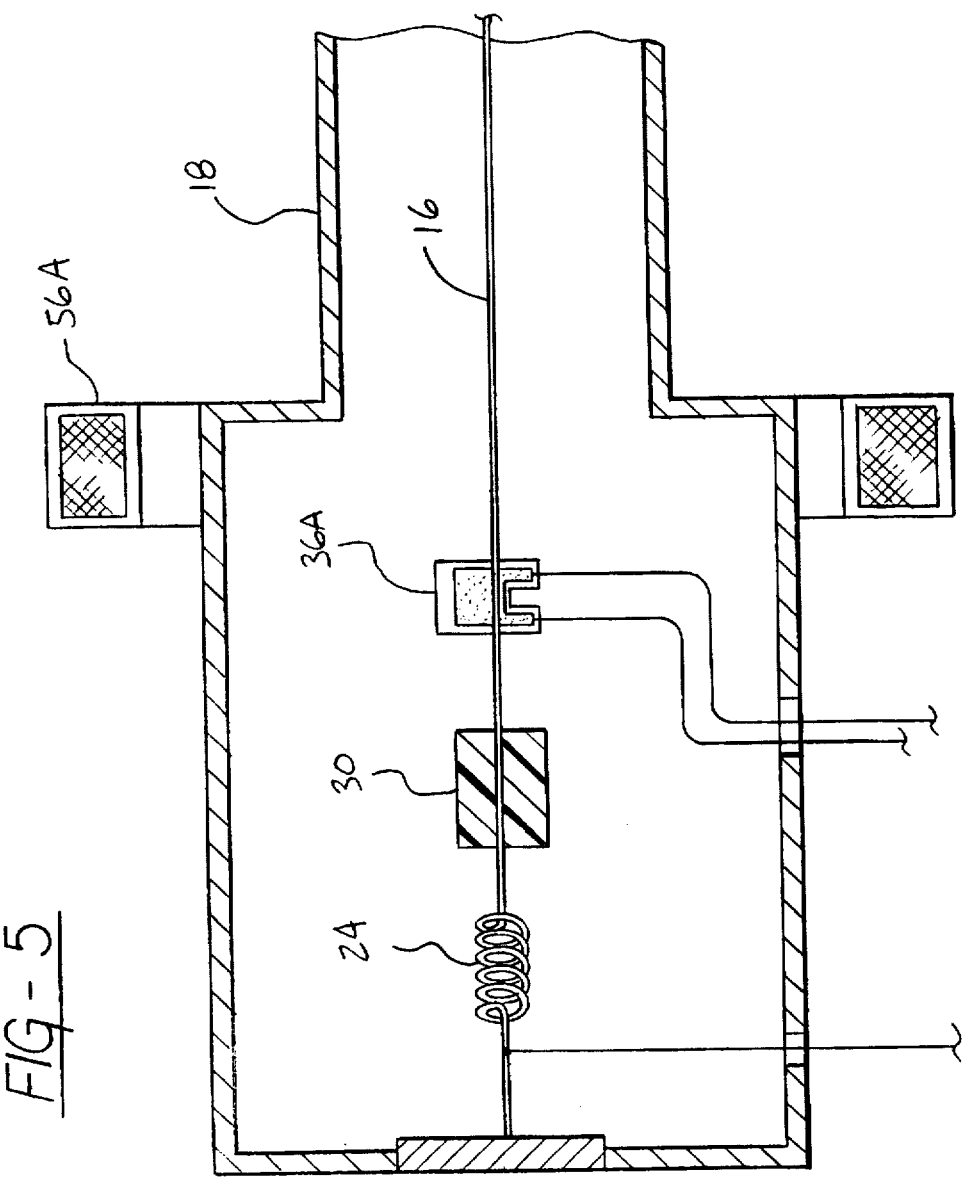
Figures 1, 2:
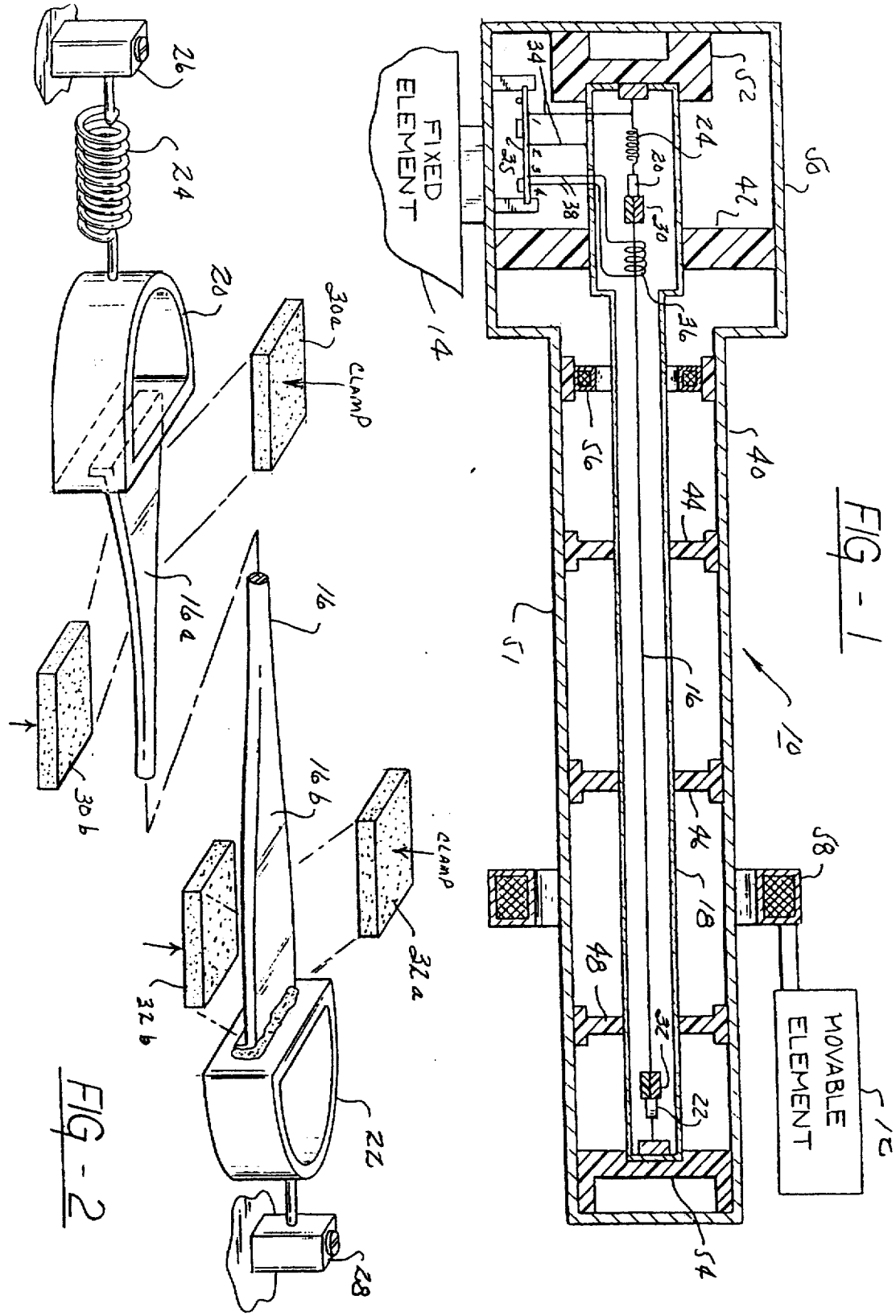

FIGS. 5 and 6 illustrate a portion of the apparatus of FIG. 1 using an alternative form of signal pickup 36a and a relocated reference magnet 56a. Pickup 36a comprises a thin film of piezoelectric material on a pliable carrier. The pickup is clamped against waveguide 16 such that the sonic disturbances, essentially a torsional twist which propagates along the waveguide, locally stretches and strains the piezoelectric material sufficiently to produce an output in the 10–100 mv range. Suitable film-type piezoelectric transducers are available from AMP Incorporated of Valley Force, Pennsylvania under the product designation LDTL-028K.

The piezoelectric pickup 36a permits the reference magnet 56a to be moved to a location very close to the pickup 36a; i.e., a location which would place the conventional coil pickup 36 of FIG. 1 in the magnetic field and create a risk of signal degradation. The film pickup 36a, therefore, allows for a more compact product design.

FIG. 6 shows the pickup 36a mounted on a rigid base 80 which is integrated with housing 18. A compliant pad 78 and a clamp 76 holds the waveguide 16 against the surface of the piezoelectric pickup.

In general, the operation of the device shown in FIG. 1 entails the application of a current pulse to the wire waveguide 16 by way of input wires 34. This current pulse reacts to the magnetic fields created by the reference and user magnets 56 and 58, respectively, to create essentially simultaneous sonic disturbances or impulses in the wire waveguide which propagate linearly in both directions. The pick-up coil 36 receives the sonic disturbance from the reference magnet 56 first in time and calculates its propagation time for purposes hereinafter described. Coil 36 receives the sonic disturbance associated with user magnet 58 second in time, the interval between the arrival of the impulse from reference magnet 56 and the arrival of the pulse from user magnet 58 being a function of the axial position of magnet 58 along the outside surface of the tube 40. Because sonic propagation speed in waveguide 16 is known, the time between the arrivals of the pulses is an indication of the position of the moveable element 12 relative to the magnet 56 and the fixed element 14 on which the housing 40 is carried. Using apparatus and methods hereinafter described, the exact length of the time interval is determined and the position of the moveable element 12 is either recorded or displayed, the term "display" being used herein to represent any effective utilization of the position signal output.

Figure 2:
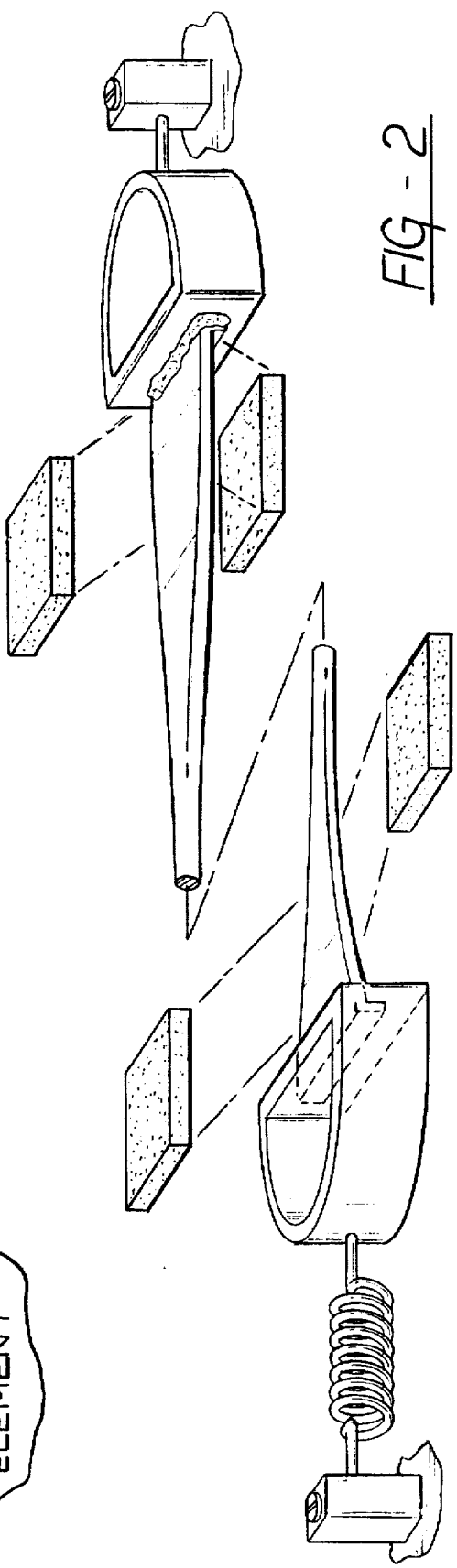
FIG. 2 is an exploded perspective view of the wire waveguide emphasizing the termination configuration details.

Referring now to FIG. 2, the physical configuration of the wire waveguide 16 and particularly the left and right terminal ends thereof are shown in detail. The wire waveguide which, as mentioned above, can be effectively any desired length, is nominally of circular or round cross-section throughout the measurement field. However, to reduce the amplitude of the reflections of sonic disturbances propagating along the waveguide from the terminal ends thereof, the left and right terminal portions 16a and 16b which lie outside of the measurement field; e.g., end portions of approximately 1"–3" in length, are mechanically physically altered in section into a gradually flattened and widened shape. These terminal end portions are attached, such as by soldering, to the end surfaces of the conductive shackles 20 and 22 as shown in FIG. 2. Obviously, other attachment mechanicals can be employed. It has been found that a gradual rather than an abrupt change in waveguide wire configuration reduces the tendency of the waveguide material to reflect sonic disturbances propagating along the wire. The term "gradual" means that the cross-sectional shape change occurs over a length which is larger than and, typically, a multiple of the nominal wire diameter. Moreover, the change from a circular or round configuration to a flat, widened, essentially rectangular configuration over a distance which is large relative to the diameter of the wire changes significantly the surface area to volume ratio of the wire material and provides a large surface area for physical contact with pads 30a, 30b and 32a, 32b at the left and right terminal ends of the wire 16, respectively. The pads 30 and 32 are suitably clamped into a contacting configuration which sandwiches the flattened portions 16a and 16b of the wire waveguide 16 therebetween. The result is a substantial reduction in sonic reflection at the terminal ends and a simplification of the signal processing circuitry as hereinafter described. The shape transition of the terminal ends of the waveguide 16 has been found to provide reflection dampening ratios of up to 100:1 as compared with prior art anti-reflection techniques which provide ratios of only about 20:1. Moreover, the flattened sections 16a and 16b have been found to be far less sensitive to clamping pressure and, therefore, give rise to relaxed construction requirements and greater uniformity in product performance. Coil 36 is spaced far enough from left end of waveguide 16 to be around the uniform 0.025" diameter portion thereof.

Figure 3:
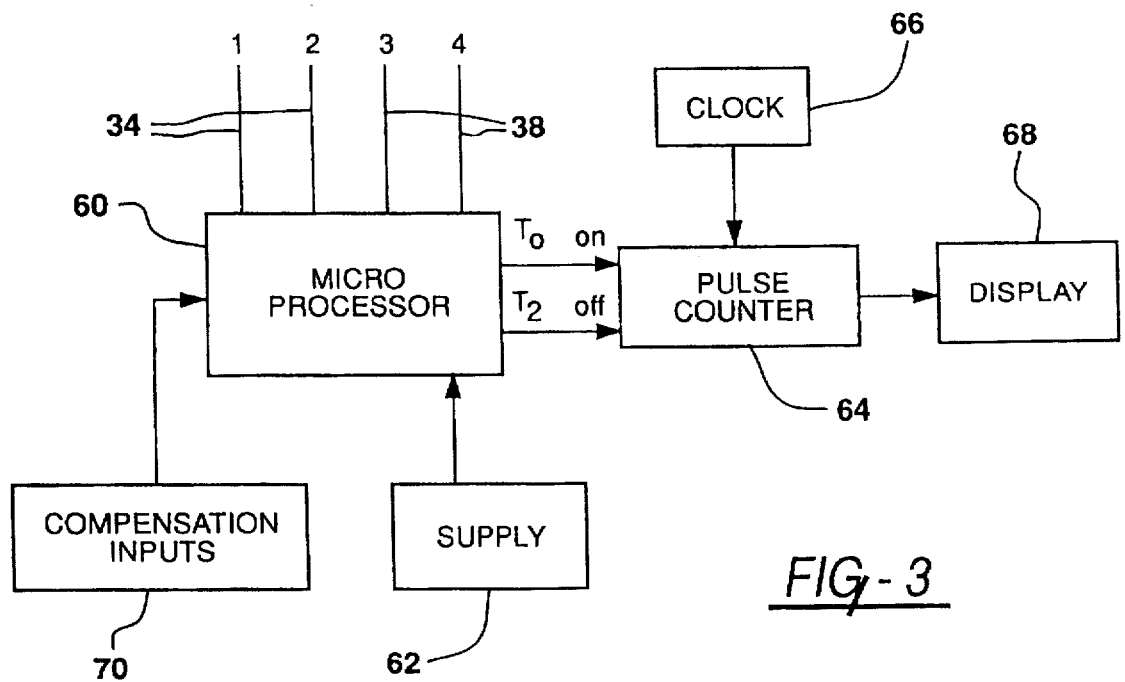
FIG. 3 is a schematic block diagram of a signal processing system or "computer" utilized with the apparatus of FIG. 1.

Turning now to FIG. 3, the details of a signal processing system mounted on circuit board 35 for producing position signal outputs are shown. The signal processing circuitry comprises in principal part a conventional programmable digital microprocessor 60 which is connected through appropriate signal conditioning circuitry apparent to those skilled in the electronics arts to receive the input signal on wires 34 which is used to excite the wire waveguide 16 as previously described. Microprocessor 60 is connected to receive as inputs the pulses which are generated in pick-up coil 36 as the sonic disturbances from the magnets 56 and 58 propagate along the wire waveguide 16 from right to left as shown in FIG. 1. The signal processing described herein can be accomplished with electronics other than a digital computer; for example, hardwired, analog devices can be used. The terms "computer" and "microprocessor," as used herein, are not to be construed only to describe digital or even programmable devices.

Figure 4:
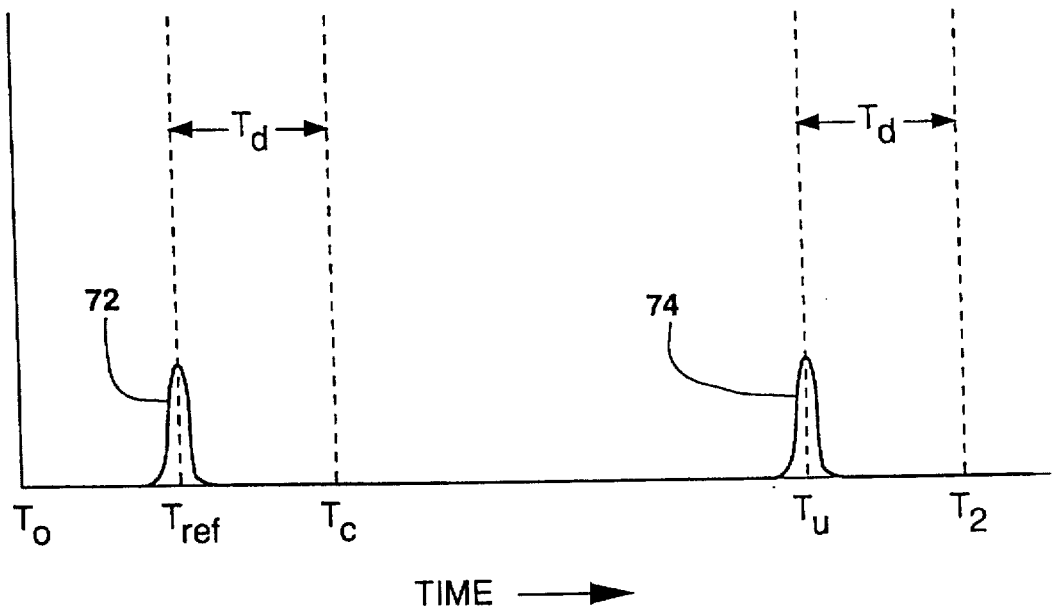
FIG. 4 is a timing diagram for use in explaining the operation of the system of FIG. 3.

As shown in FIG. 4 the occurrence of the excitation signal occurs at $T_0$ and begins the first of repetitive timing cycles. The excitation signal is applied to the ON input of a pulse counter 64 which receives and counts high frequency signals from clock 66. Position resolution is a function of the frequency of clock 66 and, therefore, it is usually chosen to run as fast as possible. At some point after the occurrence of the excitation signal at $T_0$ the first sonic disturbance from the reference magnet 56 arrives at the coil 36 and results in an output voltage pulse 72 at a time $T_{ref}$. But for the shock dampening suspension of the apparatus shown in FIG. 1 $T_{ref}$ would always occur in fixed time relationship to $T_0$; i.e., at a time related to the physical distance between the centerline of the reference magnet 56 and the location of the pick-up coil 36. The suspension system, however, permits the brass tube 18 and the concentrically mounted wire waveguide 16 therein to "float" relative to the outer housing 40 and this gives rise to small but significant changes in the distance between the centerline of magnet 56 and the pick-up coil 36 at any given time. For example, if the outer housing 40 is mounted such that the longitudinal axis thereof coincides with the longitudinal axis of an off-road vehicle to which the measurement apparatus 10 is affixed, accelerations and decelerations of the vehicle can cause the tube 18 to shift within the tube 40. A shift of the tube 18 to the right as seen in FIG. 1 has the effect of shortening the propagation time of the impulse 72 from the reference magnet 56 to the pickup 36 or 36a.

Although the shift in tube 18 is relative to both magnets 56 and 58 as previously described, it has been found desirable for reasons hereinafter explained, it is to add an increment of time, herein called a "delay interval," to the propagation time of the impulse 74 from the user magnet. The greater the shift to the right, the greater the time increment which is added to the user magnet impulse propagation time. Conversely, a shift of tube 18 to the left increases the propagation time of the reference signal and requires a smaller delay interval to be added to the user magnet impulse propagation time.

Accordingly, the time difference between the propagation time of the reference impulse 72 to pickup 36 or 36a and a constant is determined. This quantity is used in microprocessor 60 to calculate a complemental interval, $T_d$, which is thereafter added to time $T_u$ at which a voltage impulse 74 representing the arrival of the sonic propagation from magnet 58 at the pickup 36 or 36a occurs; FIG. 4 shows that the calculated interval $T_2$ is added to $T_u$ to derive a delayed pulse at time $T_u$ which is applied to the OFF input of the pulse counter 64 to terminate counting pulses from the clock 66. The pulse count between $T_2$ and $T_0$ is used to produce an output which is applied to the display 68 to determine the position of the magnet 58 relative to the fixed reference.

Using arbitrary numbers for illustration, suppose the propagation time $T_{ref}$ of the reference impulse 72 is nominally 5 units when the suspension is unflexed. Suppose further that a shift of the position of tube 18 to the right occurs and the propagation time of impulse 72 to the coil 36 is shortened to four units. The complement of four relative to a constant ten is six and, therefore, six units are added by the microprocessor 60 to the user impulse propagation time $T_u$ to compensate for the shift. If a greater shift to the right shortens the propagation time to three units, a seven unit delay $T_d$ is calculated and added to $T_u$. Conversely, shifts to the left produce shorter delay intervals $T_d$. This may be achieved by a programmable logic chip or a simple microprocessor.

In brief, the user magnet signal propagation time is delayed by the complement of the calculated longitudinal waveguide shift, if any, due to the shock-dampening suspension system.

As shown in FIG. 3, the system with which the device of FIG. 1 is used also includes transducers such as thermometers and pressure transducers, collectively represented at 70, to produce additional compensation signal inputs in a format which are compatible with the logic signal levels utilized by microprocessor 60. Those inputs are used during the delay time interval $T_d$ between $T_u$ and $T_2$ to perform compensations as necessary to adjust the timing interval and the display of a calculated signal position which is derived therefrom.

It will be appreciated that the suspension system which damps out relatively high frequency shock type inputs and prevents those inputs from reaching the wire waveguide 16 eliminates noise in the form of shock inputs to the waveguide 16 that might be recognized by the coil 36 as sonic signal quantities which are deliberately created by interaction of a current pulse through the wire and the fields created by magnets 56 and 58. The elimination of this significant noise source not only permits the utilization of the magnetostrictive wire waveguide measurement system in applications where the use environment is conducive to shock inputs but also simplifies the filtering and signal processing circuitry required in association with the microprocessor 60. It will be appreciated that this suspension system is of value in connection with magnetostrictive wire waveguide signal processing techniques other than that specifically disclosed herein.

It will also be appreciated that the transducer described herein effectively nullifies the effects of drift in the electronics associated with the device; i.e., the components mounted on board 35 in the head 50 of the device 10. Examples of such drift are frequency content, pick up coil impedance, gain and comparator thresholds, all of which can vary from hour to hour or day to day according to a variety of variable conditions.

Finally, it will be appreciated that the device of FIG. 1 can be marketed as a replacement for existing devices having no shock resistance features.

I claim:

1. In combination with a position measurement apparatus including a magnetostrictive waveguide extending through a measurement field, means for exciting the waveguide, and pickup means for generating signal impulses upon effective receipt of sonic disturbances traveling said waveguide, the improvement which comprises:
   shock-dampening suspension means for resiliently suspending said waveguide and pickup means relative to a mechanical frame of reference;
   a reference magnet mounted in fixed relationship to the mechanical frame of reference and operatively associated with the waveguide for producing a reference sonic impulse in the waveguide;
   a user magnet adapted for movement with an element to be position-monitored and operatively associated with the waveguide for producing a user sonic impulse in the waveguide; and
   means for determining the position of the user magnet relative to the reference frame from the propagation times of sonic impulses from the reference and user magnets to the pickup means.

2. Apparatus as defined in claim 1 further including a non-magnetic tubular support structure for said waveguide and said pickup; said shock dampening suspension means supporting said tubular housing for suspension of the waveguide mounted therein.

3. Apparatus as defined in claim 2 further including an outer housing enclosing the inner housing and associated with the mechanical frame of reference.

4. Apparatus as defined in claim 3 wherein the reference magnet is mounted within the housing but outside of the non-magnetic tube.

5. Apparatus as defined in claim 4 wherein the user magnet is mounted for movement outside of and along the outer housing.

6. Apparatus as defined in claim 3 wherein the inner and outer housings are cylindrical and concentric.

7. Apparatus as defined in claim 3 wherein said means for suspending comprises a plurality of resilient, shock dampening suspension elements.

8. Apparatus as defined in claim 2 wherein the wire waveguide includes non-reflective terminal portions.

9. Apparatus as defined in claim 8 wherein the non-reflective terminal portions include gradually flattened portions of the waveguide wire.

10. Apparatus as defined in claim 9 further including acoustic damping means engaging the gradually flattened terminal portions of the waveguide wire.

11. Apparatus as defined in claim 1 wherein the reference magnet is an electromagnet.

12. Apparatus as defined in claim 1 wherein the pickup means comprises a flexible film piezoelectric transducer.

13. A position measurement device comprising:
   a magnetostrictive waveguide extending linearly through a measurement field;
   means for imparting electrical impulses to said waveguide;
   a pickup associated with and in fixed spatial relationship to said waveguide for producing electrical impulses upon receipt of sonic disturbances traveling said waveguide;
   a first non-magnetic inner housing enclosing said waveguide;
   a second outer housing enclosing said inner housing;
   means for resiliently suspending said first housing within said second housing for dampening mechanical shocks imparted to the second housing;
   a reference magnet mounted in fixed relationship to and within said second housing and in surrounding relationship to said waveguide for producing reference sonic disturbances in said waveguide;
   a user magnet movably disposed in surrounding relationship to said second housing; and
   means for determining the position of said user magnet as a function of the propagation times of sonic disturbances from said magnets to said pickup.

14. Apparatus as defined in claim 13 wherein the reference magnet is an electromagnet.

15. Apparatus as defined in claim 13 wherein the pickup means comprises a flexible film piezoelectric transducer.

16. A position measurement apparatus including a magnetostrictive wire waveguide extending through a measurement field, means for exciting the waveguide and pickup means for generating signal impulses upon effective to receipt of sonic disturbances travelling said waveguide, the improvement which comprises:
   means for resiliently suspending said waveguide and said pickup means relative to a mechanical frame of reference;
   magnet means adapted for movement with an element to be position monitored in and relative to said mechanical frame of reference; and
   means for compensating the measurements of position between said wave guide and said magnet means caused by relative movements permitted by said resilient suspension such that said waveguide and magnet means appear to have a common mechanical frame of reference.

\* \* \* \* \*

UNITED STATES PATENT AND TRADEMARK OFFICE
CERTIFICATE OF CORRECTION

PATENT NO. : 5,714,881
DATED     : February 3, 1998
INVENTOR(S) : John D. Begin

It is certified that error appears in the above-indentified patent and that said Letters Patent is hereby corrected as shown below:

Delete Drawing Sheet 1, and substitute therefor the Drawing Sheet, consisting of FIGS. 1 and 2, as shown on the attached page.

Signed and Sealed this

First Day of September, 1998

Attest:

BRUCE LEHMAN

Attesting Officer

Commissioner of Patents and Trademarks